July 17, 1956 M. R. GARE 2,754,800
FLOATING AQUARIUM FEEDING DEVICE
Filed Sept. 15, 1954
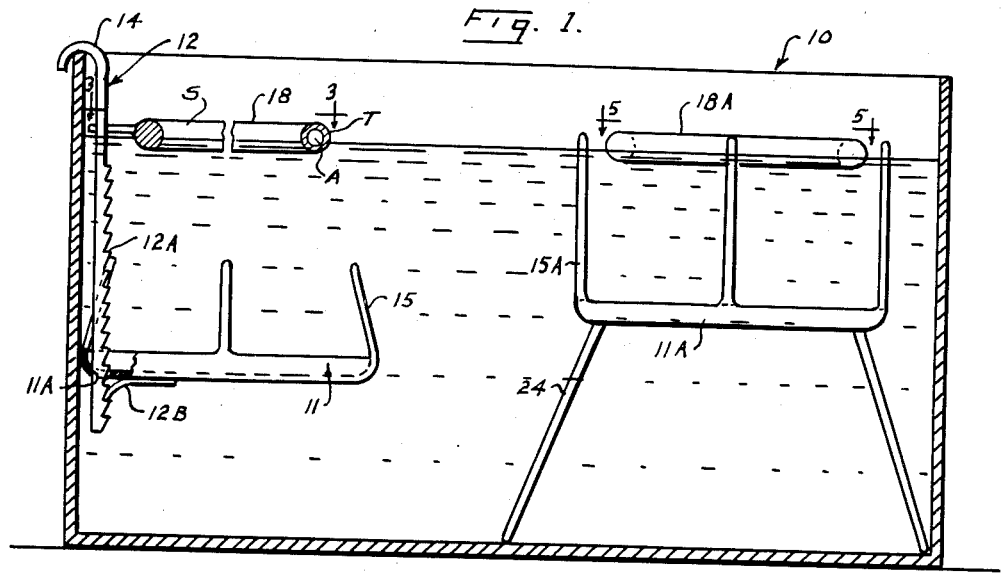
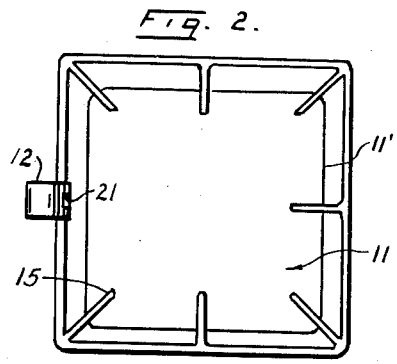
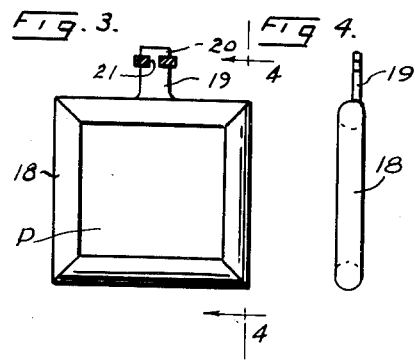
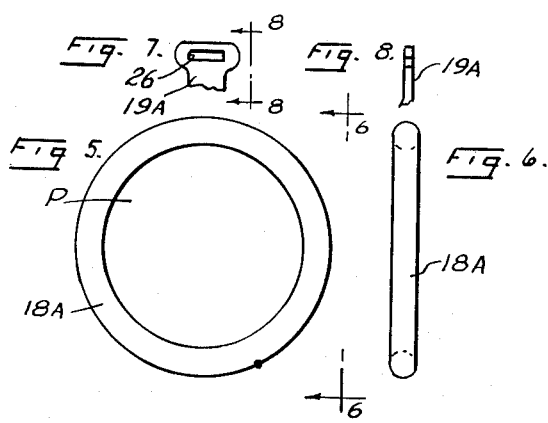
INVENTOR
MORRIS R. GARE
BY
Howard J. Jeanhon
ATTORNEY

United States Patent Office 2,754,800
Patented July 17, 1956

2,754,800

FLOATING AQUARIUM FEEDING DEVICE

Morris R. Gare, Hillside, N. J.

Application September 15, 1954, Serial No. 456,144

4 Claims. (Cl. 119—5)

This invention relates to fish food dispensing devices and more particularly to a fish food retaining tray and a floating element to define the area of feeding.

One of the difficulties in feeding fish within an aquarium is that the fish food, although dry and flaky, also may include small heavy particles which will sift down through the water and, likewise, the flaky particles may absorb water and sift down through the water. Ordinarily this food will drop to the bottom of the aquarium and become embedded in the gravel and be contaminated with any dirt or scum which commonly forms around the gravel and plants found in the aquarium. It is evident that a great deal of the fish food is wasted in this manner and, if too much feed is inserted in the aquarium, the gravel bottom becomes thoroughly packed, defeating the purpose of the gravel to assist in clarifying the water.

In the prior art there is disclosed a feeding tray that is spaced from the bottom of the aquarium, but in this instance the feed is passed through a tube to reach the tray. This prevents the fish from feeding any place but within the tray. This is an objectionable feature as it is well known that the fish prefer to eat at or near the surface of the water.

It is an object of this invention to provide a feeding tray for an aquarium that is retained at a position above the bottom of the aquarium and in which a floating element is retained in a position directly over the feeding tray by the water in the aquarium and said element delineating the area through which the food must be introduced into the aquarium.

A further object of this invention is to provide a feeding tray for an aquarium that is retained at a predetermined spaced position above the bottom of the aquarium and below the surface of the water, and in which an element of smaller perimeter is positioned to float directly over said tray at the surface of the water in the aquarium.

A further object of this invention is to provide a feeding tray for an aquarium in which the feeding tray is supported by legs resting upon the bottom of the aquarium and holding the feeding tray spaced from the bottom of the aquarium and, further, in which the feeding tray has upright arms extending to the surface of the water and in which a tubular element floats within the upright arms and delineates the area within which the fish food must be introduced into the aquarium.

A further object of this invention is to provide a feeding tray for an aquarium that is retained at a position above the bottom of the aquarium and in which the feeding tray is provided with a plurality of upright elements to prevent the fish from scattering the feed from the feeding tray.

Other objects of this invention shall be apparent by reference to the accompanying detailed description and the drawing, in which—

Fig. 1 illustrates a side cross sectional view of an aquarium,

Fig. 2 illustrates a plan view of a further embodiment of the feeding tray,

Fig. 3 illustrates a plan view of the floating element taken on line 3—3 of Fig. 1, Fig. 4 is a side elevational view taken on line 4—4 of Fig. 3, Fig. 5 is a plan view of a further embodiment taken on line 5—5 of Fig. 1, Fig. 6 is a side elevational view taken on line 6—6 of Fig. 5, Fig. 7 illustrates a further embodiment of a stem element for retaining the floating element, and Fig. 8 is a side elevational view taken on line 8—8 of Fig. 7.

Referring to the drawings and especially Fig. 1, there is illustrated an aquarium 10 filled with water to a predetermined level. A feeding tray 11 is suspended within the aquarium by means of a hanger 12. The hanger 12 may be a straight rod with a hooked end 14, the opposite end of the rod 12 is provided with a rack 12A. The hooked end 14 is used to hook over the edge of an aquarium or tank 10 as illustrated in Fig. 1. The tray 11 may be provided with an aperture 11A so that it may be slideably secured to the rod 12 and by means of a manually adjusted detent 12B it may be adjusted to any position on rack 12A. The tray 11 may be retained in the position as illustrated. In a further embodiment (Fig. 2) the arm 12 and tray 11 may be formed of a single element. The tray may be formed square, circular or any desired shape as the case may be and, in order that the food will be retained within the tray 11, it is preferable to form the tray with a surrounding perimeter 11' higher than the surface of the tray similar to the formation of a dish. Likewise, since the tray is to be utilized by precocious fish, in order that the fish may be obstructed from scattering the food that accumulates within the tray, a plurality of upright elements 15 are formed around the perimeter of the tray 11. They may be shorter or longer than the elements 15 shown in Fig. 1, without departing from the spirit of this invention. They may be spaced closer or spread apart further without departing from the spirit of this invention. They may be constructed as an integral part of the tray or they may be cemented to the tray as shown. They may be formed straight or may deviate slightly from this formation without departing from the spirit of this invention, but in every instance the spacing between uprights shall be sufficient to allow the passage of fish between elements. Also illustrated in Fig. 1 is a floating element 18. Element 18 may be formed of a solid material S such as cork to insure floating, or it may be formed of a tubular material T to provide an air cell A to insure floating at the surface of the water, and element 18 may be formed of the same general shape as the tray 11 with which it is to be utilized, or it may be formed in a different shape without departing from the spirit of this invention. In order that the floating element 18 will stay in the position desired, it must be slidably attached with relation to the supporting arm 12. Referring to Figs. 3 and 4, it is apparent that with a square ring 18 an extended arm 19 may be attached to one side. Arm 19, at its outer end is provided with a key formation 20. The hanger 12 is provided with a vertical slot formation 21 (Fig. 2). The key 20 may be passed through slot 21 by turning element 18 on its side, then turning element 18 into the position illustrated so that the key 20 will slide up and down within the slot 21 to retain element 18 directly over the feeding tray 11.

A further embodiment of this invention is illustrated in Fig. 1 in which a feeding tray 11A is supported by legs 24 that rest on the bottom of the aquarium. In this embodiment the feeding tray 11A is provided with uprights 15A that extend to the surface of the water and function in the same manner as elements 15 of the prior embodiment but, in addition, provide a barrier at the surface of the water within which a floating element 18A may be positioned. Element 18A (Figs. 5 and 6) is illustrated as a tubular element with a round formation. It is apparent that element 18A will float on the surface of the water and will be retained within the boundary delineated by arms 15A.

Referring to Figs. 7 and 8, there is illustrated a different form of arm 19A. In this instance arm 19A is provided with an aperture 26, the aperture being of a size and shape to fit over a supporting arm such as arm 12 and thus, is used in conjunction with element 18 instead of arm 19, it would retain element 18 in this desired position and arm 19A would rise and fall with the amount of water in the aquarium.

It is apparent that with either the first embodiment or the second embodiment fish food introduced into the aquarium through the aperture P in element 18 or element 18A will either float on the surface of the water where it is accessible to the fish or will slowly sift through the water until it settles within the tray 11 or 11A as the case may be. It is also apparent that either device as disclosed may be readily extracted from the aquarium and cleaned without affecting the aquarium and the fish within the aquarium, and this type of device will serve to maintain the bottom of the aquarium clean and will provide a far better feeding means for the fish.

Various changes may be made to the general design of the feeding tray and the elements connected to said tray without departing from the spirit of this invention. Since this invention is only concerned with the function of this device it is apparent that the tray may be constructed of a rigid and sufficiently strong material to perform the function for which it is intended.

It is also to be noted that the tray may be formed as a decorative item without departing from the spirit of this invention and this invention shall be limited only by the appended claims.

What is claimed is:

1. An aquarium feeding tray that is removable from said aquarium and which includes a tray suspended from one side of the aquarium by a hanger and retained in a parallel relationship with the bottom of the aquarium but spaced above the bottom of the aquarium, and a floating element in the form of an air-filled tube having a general contour similar to said feeding tray and slightly smaller than the perimeter of said feeding tray, said floating element providing a large central feeding aperture, said floating element slidably connected to said hanger so that said floating element will rise or fall with the level of the water in said aquairium.

2. In a device according to claim 1, said feeding tray being generally square in shape and said floating element being generally square in shape.

3. In a device according to claim 1, said feeding tray provided with a plurality of upright elements.

4. An aquarium feeding tray that is removable from said aquarium and which includes a tray suspended from one side of the aquarium by a hanger and retained in a parallel relationship with the bottom of the aquarium but spaced above the bottom of the aquarium, and a floating element having a general contour similar to said tray and slightly smaller than the perimeter of said tray, said floating element providing a large central feeding aperture, said floating element slidably connected to said hanger so that said floating element will rise or fall with the level of the water in said aquarium.

References Cited in the file of this patent
UNITED STATES PATENTS

| 1,976,962 | Pape | Oct. 16, 1934 |
| 2,583,911 | Webster | Jan. 29, 1952 |

FOREIGN PATENTS

| 143,395 | Germany | Aug. 15, 1903 |